W. R. THOMAS.
RAILWAY SPIKE.
APPLICATION FILED OCT. 17, 1917.
1,294,570.
Patented Feb. 18, 1919.
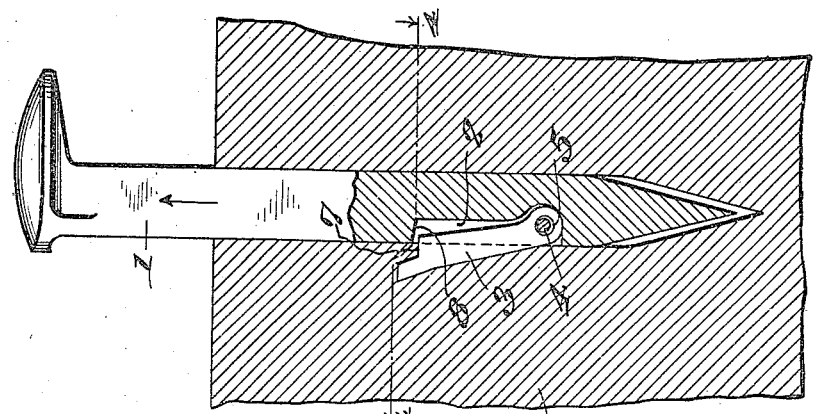
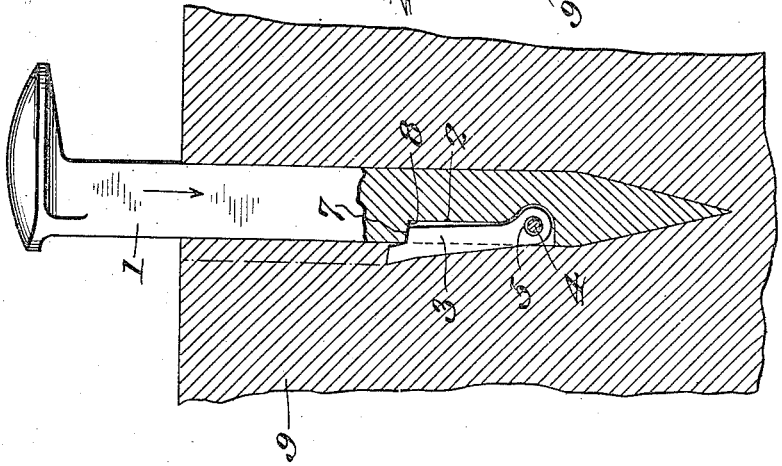
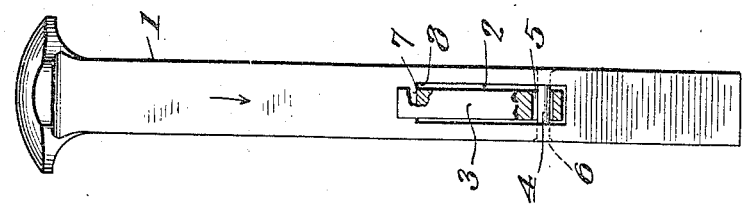
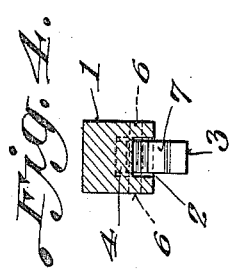
Inventor,
William R. Thomas
by Erwin & Wheeler
Attys.

UNITED STATES PATENT OFFICE.

WILLIAM R. THOMAS, OF WATERTOWN, WISCONSIN, ASSIGNOR, BY MESNE ASSIGNMENTS, OF ONE-HALF TO ALFRED PRICE, OF WATERTOWN, WISCONSIN.

RAILWAY-SPIKE.

1,294,570.            Specification of Letters Patent.         Patented Feb. 18, 1919.

Application filed October 17, 1917. Serial No. 197,075.

*To all whom it may concern:*

Be it known that I, WILLIAM R. THOMAS, a citizen of the United States, residing at Watertown, county of Jefferson, and State of Wisconsin, have invented new and useful Improvements in Railway-Spikes, of which the following is a specification.

My invention relates to improvements in railway spikes. The object of my improvement is to provide means for more effectually holding a railway spike when driven into a railway tie formed of soft wood, whereby such spike is less liable, as heretofore, to become loose or detached by the upward pull of a railway rail; and said invention pertains more especially to the peculiar shape of the spike retaining dog and the shape of the cavity formed in the side of the spike for the reception of said dog, whereby the downward stroke of a sledge hammer or other device upon the head of the spike will be transmitted directly to said dog, without being transmitted to the dog retaining pin, and also by which any upward pull given to said spike will also be transmitted to said dog direct while the dog retaining pin will not be injuriously affected by such pull.

My invention is further explained by reference to the accompanying drawing, in which—

Figure 1 is a front elevation thereof, part being broken away.

Figs. 2 and 3 are side elevations, part broken away, and

Fig. 4 is a section, drawn on line 4, 4 of Fig. 3.

Like parts are identified by the same reference numerals throughout the several views.

The railway spike 1 is provided with a cavity or chamber 2 for the reception of the dog 3. The dog 3 is retained in said cavity by the pin 4. The pin 4 has loose bearings at its center in the hole 5, while the ends 6 of said pin are closely fitted in the walls of the spike, whereby such pin is not liable to become loose.

The dog 3 is provided with a shoulder 7 which is adapted as said spike is being driven, as shown in Fig. 2, to bear against the upper wall 8 of said cavity, whereby downward pressure upon said spike will be communicated through said shoulder to said dog, and said dog retaining pin 4 will thereby be relieved of all strain which would otherwise be communicated to it.

It will also be understood that should an upward pull be communicated to said spike such pull will act against the lower end of said dog as the hole 5 is of sufficient size, in excess of said pin, to permit of the required movement of said dog, and said dog will be free to move, as shown in Fig. 3, upwardly or downwardly in said spike far enough to contact at one of its ends with one end of said cavity, whereby said pin will be relieved of all pressure, said pin being used simply to retain said dog in place within said cavity as the spike is driven or pulled. 9 represents a railway tie of ordinary construction.

Having thus described my invention what I claim as new and desire to secure by Letters Patent, is:—

A railway spike of the described class, provided upon one side with a cavity having shoulders formed substantially at right angles to its longitudinal axis, a dog provided near one end with a hole, and at its opposite end with a shoulder adapted to project outwardly from said cavity, a pin having closely fitting bearings at its respective ends in said spike, said hole being slightly larger than said pin, whereby said dog may not only turn on said pin, but move longitudinally thereon, and whereby the same is relieved from pressure as said spike is either forced into or withdrawn from a railway tie.

In testimony whereof I affix my signature in the presence of two witnesses.

WILLIAM R. THOMAS.

Witnesses:
NICHOLAS THAUER,
RICHARD C. THAUER.

Copies of this patent may be obtained for five cents each, by addressing the "Commissioner of Patents, Washington, D. C."